Dec. 18, 1928.

P. J. CLIFFORD

TRAIN CONTROL APPARATUS

Original Filed Jan. 24, 1925   4 Sheets-Sheet 2

1,695,880

Inventor
Patrick J. Clifford

Dec. 18, 1928.

P. J. CLIFFORD

TRAIN CONTROL APPARATUS

Original Filed Jan. 24, 1925    4 Sheets-Sheet 3

1,695,880

Inventor
Patrick J. Clifford

Attorney

Dec. 18, 1928.
P. J. CLIFFORD
1,695,880
TRAIN CONTROL APPARATUS
Original Filed Jan. 24, 1925    4 Sheets-Sheet 4
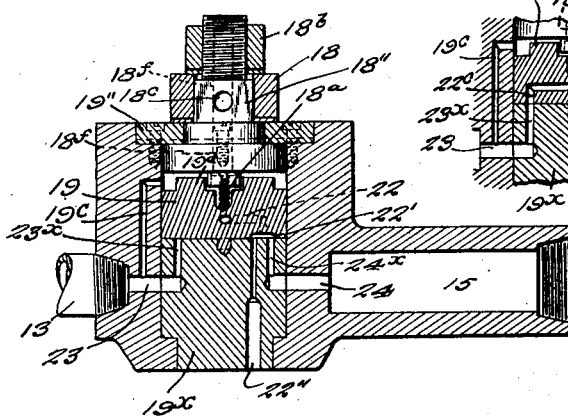
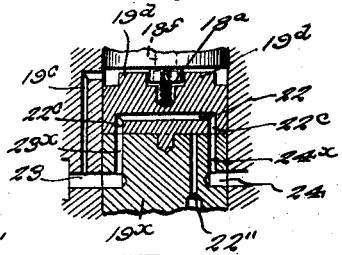
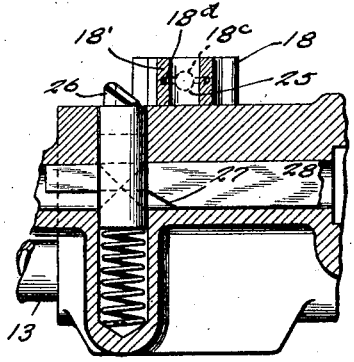
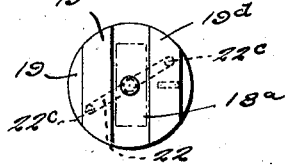
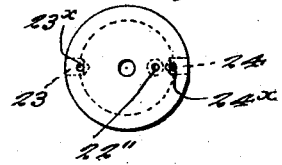
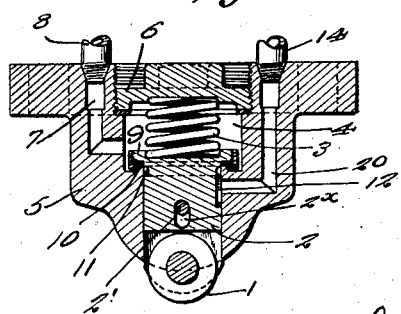
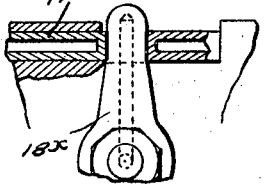
Inventor
Patrick J Clifford
Attorney Patented Dec. 18, 1928.

1,695,880

UNITED STATES PATENT OFFICE.

PATRICK J. CLIFFORD, OF FALLS, PENNSYLVANIA, ASSIGNOR TO TRAIN CONTROL CORPORATION OF AMERICA, OF NEW YORK, N. Y., A CORPORATION OF DELAWARE.

TRAIN-CONTROL APPARATUS.

Application filed January 24, 1925, Serial No. 4,464. Renewed May 15, 1928.

This specification is a continuation in part of that belonging to application for Letters Patent of the United States filed by me Aug. 21, 1918, #250,803 and it also embodies subject matter disclosed in my application for Letters Patent of the United States filed by me Mar. 24, 1919, Serial Number 284,731.

In the accompanying drawings:

Figure 6 is a detail view of the engineer's disabling valve.

Figs. 7, 8, 9, 10 and 11 are views relating to details of the trigger valve.

Fig. 12 is a detailed view of a modified structure relating to the trigger valve.

Fig. 13 is a detailed sectional view of the contact valve.

Figure 1:
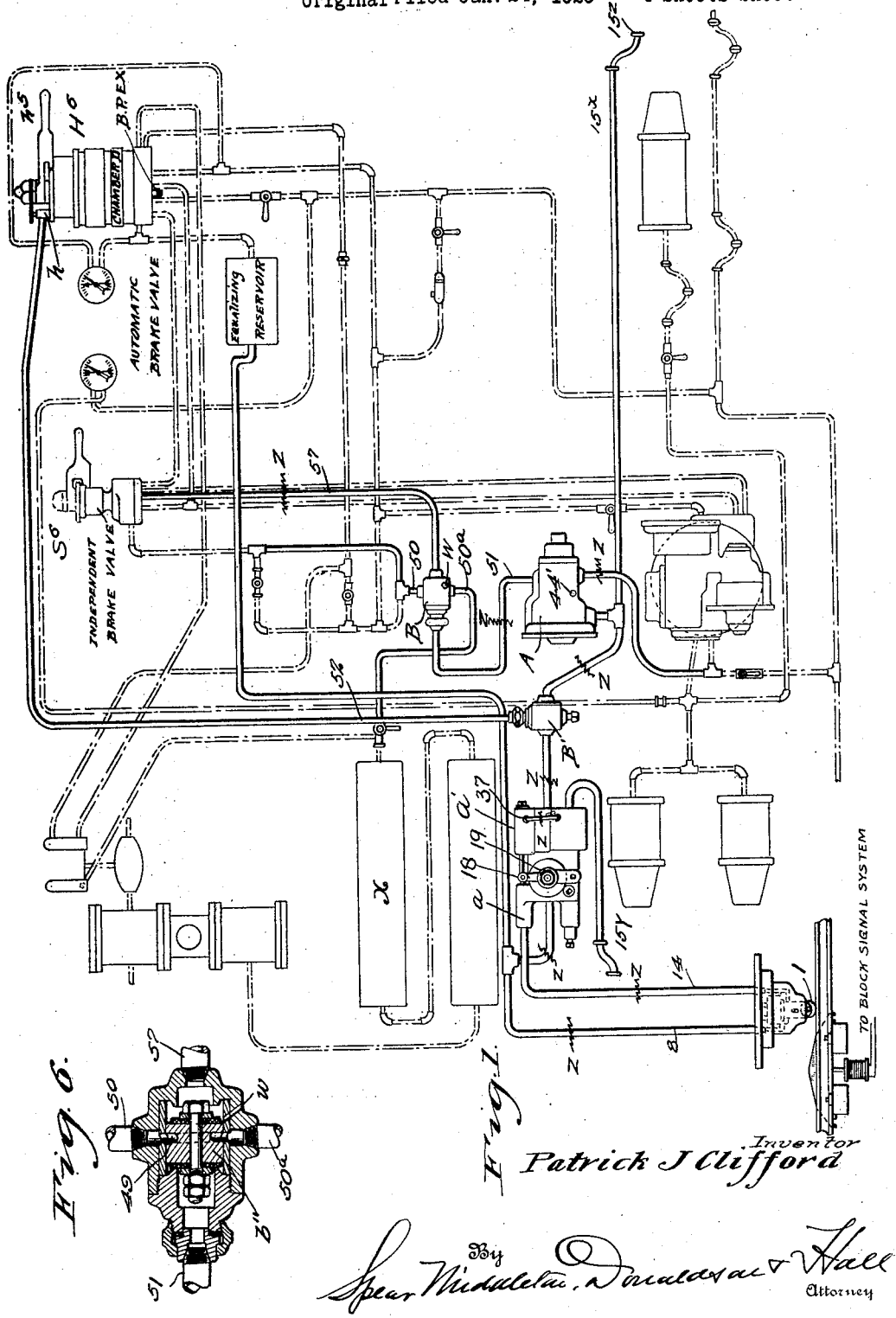
Figure 1 is a diagrammatic view of the system.
Figure 2:
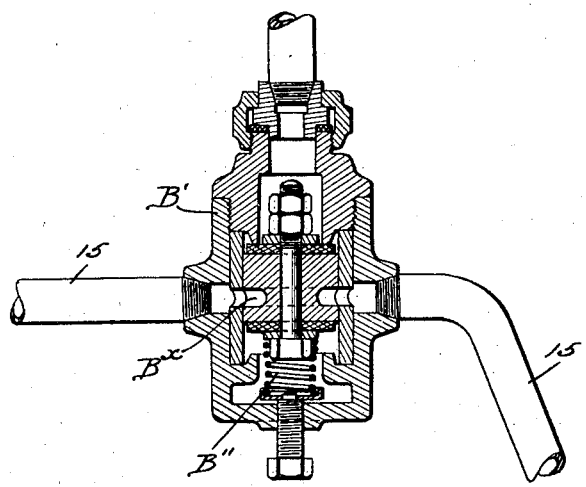
Figure 2 is a detail view of the valve for eliminating the functions of the automatic train stopping system.

When the roller 1 on the engine strikes the ramp or track implement the contact valve is lifted allowing air pressure from the ordinary equalizing reservoir of the Westinghouse system to pass from pipe 8 to pipe 14 and thence to cylinder $a$, where acting on a piston $b$ a valve 19 is turned through rod 17 and arm 18, the turning of the valve connecting by its passage or part 22 the pipe 13 with pipe 15, so that pressure from the Westinghouse equalizing reservoir can pass to a casing A, causing a valve therein to open port 44' for the release of air from the train pipe, thereby setting the brakes. The air pressure let into the casing A also passes through pipe 51 to an engineer's disabling valve in casing B and sets this to cut off communication between pipes 50 and 50$^a$, thus preventing the engineer from recharging the train line pipe, by operating the Westinghouse automatic brake valve H$^6$, until after a prescribed period of time has elapsed during which time the train will have come to a stop. This prescribed period of time which must elapse before the engineer can recharge the train line pipe and take off the brakes is due to the fact that the air pressure introduced into the casings at A and B to operate the valves therein must be bled from these parts before these valves can be restored to normal position and the bleeding effect will not be initiated until pressure has built up in pipe 15 sufficiently, that, passing through bleed port 15$^a$ and bleed pipe 37, the valve 19 will be turned as hereinafter described to cut off communication between pipes 13 and 15 and open bleed port 22'' allowing air pressure to bleed from valve casings A and B, and only when this has occurred can the disabling valve $b''$, be reset by the engineer sending pressure through the pipe 57 from the ordinary Westinghouse independent brake valve S$^6$.

As stated above the air pressure for operating the automatic air release valve A and the engineer's disabling valve B is derived from the equalizing air reservoir of the Westinghouse system.

The disabling valve is located in the pipe connection 50$^a$, 50 extending from the main reservoir to the engineer's valve organization so that when this pipe connection is closed, by the disabling valve B, the engineer will not be able to supply air to the train pipe for recharging the same.

Now describing the parts, and operations more in detail:

In these drawings 1 indicates a roller carried by a stem 2, normally pressed down by a spring 3 contained in a chamber 4 of the casing 5, which contains and guides the said stem or plunger. The chamber 4 has an airtight cover 6 and it receives air from the standard Westinghouse equalizing reservoir through the port 7 and pipe 8, being thus in constant open communication with the compressed air supply in said reservoir.

The plunger or stem 2 is provided with a head or valve member 9 provided with suitable packing and resting on the seat 10, and below the head the stem has a circumferential groove 11 and in one side of the stem there is formed a passage 12 communicating with the said annular groove and also with a discharge port or passage 20 extending through the casing 5 and having a pipe 14 extending therefrom to a cylinder $a$ containing a piston $b$ connected by a rod 17 with the arm 18 of a rotary trigger valve member 19, which controls the inlet or delivery of air pressure from the equalizing reservoir through the pipes 13 and 15 to the automatic release valve A, which controls the automatic setting of the brakes, this valve 19 having the port or passage 22, which, when the valve is turned into a certain angular position, will connect the passages 23, 24, leading through the casing from the pipe 13 and to the pipe 15 respectively.

With the parts as described thus far it will be seen that when the stem or plunger 2 is raised by its roller running over the track instrument or ramp air from the equalizing reservoir will pass through the pipe 8, passage 7, chamber 4, annular groove 11, due to the lifting of the head or valve member 9 from its seat, and the air will thence pass through the port 12, passage 20, and pipe 14 to the cylinder $a$, where acting upon the piston $b$ the rod 17 through arm 18 will turn the valve 19 and thus pipes 13 and 15 will be thrown into communication and the air from the equalizing reservoir will pass through these pipes to the automatic release valve A to set the brakes and to the engineer's disabling valve shown generally at B.

The valve arm 18, when the valve is operated, as just described, is set in an angular position of about thirty degrees. This valve also has an arm 18′ which, when the valve is turned as just described, presents an opening 25 to be engaged by a locking bolt 26 spring pressed and mounted in the casing, said bolt serving to hold the valve in operated position long enough to insure the proper operation of the brakes.

For unlocking the valve and restoring it to normal position the following arrangement is provided:

The bolt 26 is acted on by an incline 27 of a cam slide 28 consisting of a bar attached at one end to a piston 36 in a chamber 35, which chamber at a point back of the piston is connected with the air pipe 15 by a small port 15$^a$. The other end of the cam slide is acted on by a spring 30 in a casing 31, which spring is adjusted as to its tension by a screw 32 bearing on a washer 33, a second washer 34 being arranged between the spring and the cam slide. A passage or pipe 37 connects the interior of the chamber 35 with the piston chamber $a'$.

After the piston of the automatic air release valve A and the piston in the engineer's disabling valve B are operated by the pressure supplied thereto through the pipe 15 the pressure will build up in the said pipe 15 and this pressure will now pass into the chamber 35, through small port 15$^a$, previous to the operation of the pistons just mentioned, and while the flow of air through the pipe 15 is continuing and moving the said pistons of A and B the piston 36 will remain in the position shown at the right of the chamber 35, due to the spring 30, the strength of which is so adjusted that while any air is passing through pipe 15 the spring will hold the piston 36 in the position shown, but as soon as the pistons in the valve chambers of the automatic air release valve A and the engineer's disabling valve B have been operated and the pressure builds up in pipe 15 it will pass through port 15$^a$ and build up also in chamber 33 forcing the piston 36 to the left and thus operating the cam slide to retract the bolt 26 against the pressure of its spring and thus releasing the arm 18′ of the rotary valve, so that this valve may be returned to normal position, and thus cut off the air from the pipe 15. This operation of the valve back to normal position takes place by the built up pressure of air passing from cylinder 35 through the pipe 37 into the chamber $a'$, where acting on the piston $b'$ it will move said piston leftward, and through the rod 17′ the arm 18 of the valve will be moved leftward, thus returning the valve to normal position.

The return of the valve 19 to normal position, as just stated, cuts off the supply of air to pipe 15 and at the same time brings a passage 22′ in the valve to register with the port 24$^x$ of passage 24 and the port 22″ for bleeding the pipe 15 and the piston chamber of the automatic air release valve A and the engineer's disabling valve at B. The port of the passage 23 is shown at 23$^x$.

The ports 23$^x$, 24$^x$ extend vertically in a valve seat block 19$^x$ on top of which the valve 19 rotates, the port or passage 22 in the valve 19 having vertical portions 22$^c$ to register with the ports 23$^x$, 24$^x$. The bleeding port 22′ extends vertically through seat block 19$^x$.

Reverting to the contact plunger 2 it will be observed that this is guided by a pin 2′ passing through a slot 2$^x$, which holds the plunger from turning, and keeps the passage 12 in registration with the port 20. This pin and slot connection also limits the upward movement of the plunger and the roller 1 is kept in proper position to roll properly on the track instrument.

Reverting to the trigger valve 19 a port 19$^c$ extends through the casing of this valve from the air pipe 13 to the chamber in which the valve 19 is contained, so as to exert air pressure downwardly on said valve to equalize the air pressure tending to lift said valve, enabling the valve to be easily operated.

The valve block 19 is provided with two ribs 19$^d$ on its upper side between which engages a lug or rib 18$^a$ of a key or plug, which has a square portion at 18″ to receive the lever 18, and a threaded portion to receive the nut 18$^b$. The chamber containing the valve is closed by a cover 19″.

The air pressure in the chamber containing the valve 19 exerts an upward pressure against the plug and keeps it air tight against the washer on the bottom of cover 19″.

The automatic air release valve comprises a casing 40 in which a valve member 41 slides, said valve having ports 42, 43 of graduated size and a long port 44 by which the air from the train line pipe may be released to atmosphere through the port 44' of the casing, when the valve is moved to the right, thereby bringing the ports, in the order of their size, to the port 45 of the train line pipe for the gradual setting of the brakes. The valve is moved by pressure let into the pipe 15 by the trigger valve 19, which pressure acts upon a piston 46 in the cylinder 47, the stem 48 of this piston carrying the automatic air release valve member 41 along with it.

The automatic air release valve will be returned to normal or closed position by the spring 48' when the air pressure is reduced in pipe 15 by bleeding out through the port 22'' at the trigger valve 19, as above described.

The engineer's disabling valve B consists of a piston $b''$, slidable in a casing and having a port or circumferential groove 49 adapted to connect the pipes 50, 50$^a$ for the passage of air to the engineer's valve for recharging the train line pipe, but when the piston is moved from the position shown communication between the pipes 50, and 50$^a$ will be cut off. A pipe 51 leads to the casing at the left of the said piston valve, this pipe extending from a port 52 in the casing of the automatic air release valve. This port is controlled by a valve 53 sliding with the automatic air release valve being connected with the stem of the piston 46. This valve 53 also controls the inlet of air through the port 54 from the pipe 15 by way of the cylinder 47 and by-pass 55 and it also controls a bleed port 56, by which pressure is removed from the left side of the disabling valve at B to allow said valve to return leftward at such time, after said pressure reduction, that the engineer may operate the independent brake valve S$^6$, and send air through pipe 57. The valve 53 has ports 53$^a$ and 53$^b$ and it is shown in position to allow the escape or bleeding of the pressure through the port 53$^a$, 53$^b$ and 56.

The engineer's independent brake valve S$^6$ has a pipe 57 connected with its exhaust port and this pipe connects with the casing of the disabling valve B at the right of the piston thereof. The casing of this valve has an exhaust port W therein, through which the air from the exhaust of the valve S$^6$ passes out.

It will be understood that when the system is operated by the roller 1 striking the ramp resulting in the release of train pipe pressure through port 44' of valve at A and the setting of the engineer's disabling valve at B in disabling position the engineer cannot recharge the train line through pipes 50, 50$^a$ to release the brakes until after the prescribed period of time has elapsed necessary to reset the trigger valve 19 to bleeding position and reduce the pressure on the automatic air release valve and the disabling valve, and only after these actions have taken place can the engineer recharge the train line by operating the engineer's independent brake valve 3$^6$, which will move the valve B to connect pipes 50, 50$^a$, leading from the main air reservoir to valve H$^6$, or from the automatic brake valve H$^6$ of the Westinghouse system, to the train pipe.

In the operation of the apparatus when the trigger valve 19 is operated air will be delivered from the equalizing reservoir through pipe 15 to the piston 46 of automatic air release valve at A thereby setting said valve 41 against the resistance of its spring in position to discharge the air from the train pipe through port 44' and thus automatically set the brakes. The movement of the piston 46 of this valve at A will also set the valve member 53 in position to deliver air pressure to the engineer's disabling valve at B; this delivery taking place through the by-pass 55, port 54, the valve port 53$^b$, the port 52 and pipe 51, and as a result the piston $b''$ will be forced to the left, thus breaking communication between the pipes 50, 50$^a$, and thus disabling the engineer's valve H$^6$, (Westinghouse automatic brake valve), and all other parts of the system because the operation of the engineer's independent brake valve S$^6$ (Westinghouse) to admit engine-brake-cylinder pressure through the pipe 57 cannot return the piston $b''$ to the left until the equalizing reservoir pressure is bled out from the right-hand side of the said piston and this reduction of pressure will not occur until after certain actions have transpired and therefore the engineer's valve and system will be cut out or disabled for a prescribed period of time during which the brakes remain set and this time is calculated to be long enough to bring the train to a stop. The actions which transpire during this prescribed period are: the building up of pressure in the pipe 15 beyond the trigger valve after the automatic air release valve 41 and the control valve 53 reach their positions at the right, and after the piston valve $b''$ reaches its left-hand position, which built-up pressure results in the unlocking and resetting of the trigger valve to normal position, after which the bleeding of the pipe 15 takes place, through port 22'' allowing the automatic air release valve and the valve 53 to return to normal position and finally the bleeding of the valve casing at B takes places on the right of the piston through the returned valve 53 and the port 56, thus rendering the piston $b''$ in condition to be moved leftward when pressure, at the will of the engineer, is brought to bear on its left side by operating the engineer's independent brake valve S$^6$ and sending air through pipe 57.

This predetermined period of time during which the system is disabled may be varied by adjusting the tension of the resistance spring 30, by means of the screw 32, the adjustment of this screw requiring that the pressure in pipe 15 be built up to a greater or lesser degree in order to overcome the resistance of spring 30 and thus permit the unlocking of the valve 19 and its return to normal position for the bleeding of the connections to the automatic air release valve and the disabling valve at B.

*Eliminating valve.*

The above mentioned system provides for bringing the train to a full stop and presupposes that the engineer is out of service through accident, sickness, or death on reaching the caution signal, or is not paying proper attention to his duty.

These instances are, however, rare as compared with the number of efficient engineers in service and the further improvemnt now to be described presupposes that the engineer will be in condition to do his duty and it therefore provides means whereby the engineer on approaching a caution signal may continue running his train, provided he is paying attention to his work and slows down the speed of the train upon running into the danger zone.

In carrying out the invention there is provided an automatic stop-eliminating-valve indicated generally at B′, this being located in the pipe 15 which extends from the automatic trigger valve 19 to the automatic air release valve A of the system above described. This automatic-stop-eliminating valve may be of a piston form similar in general aspects to the engineer's disabling valve B, in that the piston valve operates in a cylinder. Air is supplied to this eliminating valve from the automatic brake valve H⁶ by a pipe 52 which extends from a supplemental valve casing $h$, mounted on the casing of the automatic brake valve and having a supplemental valve $h^2$, therein to control the inlet of air from this automatic brake valve to the pipe 52. This supplemental valve is held on its seat to prevent air passing through the pipe 52 to the eliminating valve by main reservoir pressure. As an illustration, I may employ a cam member $h^3$ on the handle of the automatic brake valve which rides over the ball $h^4$ on the fluted stem of the supplemental valve $h^2$ to force it from its seat, so that when the handle $h^5$ of the automatic brake valve is turned into a position to slow down the train, the ball $h^4$ will be depressed by the tail of the handle working over it and the valve will be opened to allow the air pressure to pass from the space $h^6$ of the engineer's automatic brake valve, which air pressure will pass by way of pipe 52 to the eliminating valve operating the piston thereof, so as to cut off communication between the pipe 15 and the automatic air release valve A and engineer's disabling valve B to thereby prevent the operation of these valves and consequently preventing stopping of the train.

Should, however, the engineer fail to put the automatic brake valve H⁶ in service position, i. e. for slowing down the train, the eliminating valve B′ will remain in its normal position, allowing communication between the pipe 15 and the automatic air release valve A and engineer's disabling valve B, so that upon the trigger valve 19 operating, as a consequence of the contact member 1 riding over the ramp, air from the equalizing reservoir will pass through the trigger valve, pipe 15 to automatic air release valve A, which will operate to open release port 44′ allowing the escape of air pressure from the train line pipe, and at the same time equalizing reservoir air will pass through the valve casing of the valve A and pipe 51 to the engineer's disabling valve B, setting this in position to cut off main reservoir air to the engineer's valve so that the engineer cannot restore pressure to the system until a prescribed period has elapsed, this disabling action cutting off communication between the pipes 50, 50ᵃ, which communication is necessary in order to recharge the train line pipe and take off the brakes.

The supplemental valve $h^2$ is pressed normally onto its seat by a spring $h^7$. The eliminating valve is pressed to its normal position to allow air to pass from pipe 15 to the automatic air release valve and engineer's disabling valve by a spring B″. This eliminating valve is of piston form and has a passage Bˣ for the flow of the air through it when in normal position.

The eliminating action, i. e. cutting out the automatic operation of the automatic stop system can take place only when the engineer places the automatic brake valve H⁶ in service position.

If, after having placed this valve in service position to slow down the speed, the engineer, by reason of becoming suddenly incapacitated or for any other reason should put the handle of this valve out of service position the air pressure will be taken off from the eliminating valve piston and the spring B″ will force this valve to normal position allowing air pressure to pass to the automatic air release valve A and the engineer's disabling valve B with the result that the train will be stopped automatically and the engineer will be unable to prevent such action. This taking off of the air pressure from the eliminating valve may occur by the discharge of air past the ball $h^4$ when this rises.

It will be seen therefore that if the engineer does not put the automatic brake valve in service position on approaching a caution signal the train will be stopped automatically.

If he places it in service position the automatic stop mechanism will be cut out of action and the train will slow down. If he places this valve H⁶ in service position to slow down, and thereafter for any reason changes its position while arm 18 of trigger valve is held by locking bolt 26, the automatic stop action will take place.

It will be understood that as the equalizing reservoir is connected with the standard engineer's valve shown at H⁶ (called in the Westinghouse literature automatic brake valve) the stopping of the train will be effected, not only when all the parts of the apparatus are in proper working condition, but also when a rupture in any of the connections or when any parts are removed. A rupture of the connections in any part of the improved system will cause a reduction of the pressure in the equalizing reservoir and as a result the pressure in "chamber D" (so lettered in Westinghouse literature) of the automatic brake valve H⁶, above its piston will be reduced allowing this piston to rise and this will open the brake pipe "exhaust port" to atmosphere and release train pipe pressure, and set the brakes. This exhaust port is indicated on the drawing at B. P. Ex.

This action will take place no matter where the accidental rupture occurs in the improved apparatus or attachment, for instance at any of the points marked $z$, whether this be between the equalizing reservoir and the contact valve; or between the contact valve and the actuating (trigger) valve or between the actuating valve and the eliminating valve, or between the eliminating valve and the automatic service (air release) valve, or between the automatic service valve and the disabling valve.

Following out these various contingencies we will suppose that a break occurs between the equalizing reservoir and the contact valve. This will immediately reduce pressure in the equalizing reservoir with the result that the automatic brake valve (H⁶) will operate because of reduction of pressure in its chamber D and by consequent rise of its piston open its exhaust port to atmosphere for escape of train pipe pressure.

If the rupture occurs between the contact valve 9, and the actuating valve (trigger valve) 19 pressure in the equalizing reservoir will be reduced, not immediately, but when the contact valve is operated and train pipe pressure will be reduced through the exhaust of automatic brake valve as before.

If the rupture occurs between the actuating (trigger) valve 19 and the eliminating valve B' the pressure in the equalizing reservoir will be reduced as soon as this actuating valve is operated by the setting of the contact valve; in fact if the breakage occurs at any point beyond the actuating valve i. e. between it and the eliminating valve; between the eliminating valve and the automatic service (automatic air release) valve, or between the automatic service valve and the disabling valve the pressure in the equalizing reservoir will be reduced, not immediately, but this will take place as soon as the actuating (trigger) valve is operated by the contact valve.

If a break occurs between the disabling valve and the engineer's independent brake valve this will in no way affect the automatic stopping operation, but will only prevent the engineer from recharging the system until the break is repaired.

In order that my improved control system may operate efficiently with a plurality of locomotives, as for instance on a train provided with a double header, I extend the pipe 15 rearwardly for any suitable distance, as for example to the rear end of the tender, as indicated at 15ˣ, where it terminates in the usual valved flexible coupling 15ᶻ.

At the front of the locomotive I locate a pipe 15ʸ having a terminal valved flexible coupling adapted to be coupled to the rear end of the pipe extension 15ˣ, which pipe 15ʸ communicates with the cylinder 35 in rear of the piston 36.

Supposing pipe 15ʸ of a following locomotive to be coupled to pipe 15ˣ of the preceding locomotive, the operation of lever arm 18 of the front locomotive and consequent admission of air to pipe 15 will operate the brakes as above described. Compressed air flowing through pipe 15ˣ and 15ʸ into cylinder 35 of the rear locomotive will move the piston forward, causing cam bar 34 to depress the dog.

The result of this is that while the track contact device will operate lever arm 18 of the second locomotive, it will instantly return to normal position, owing to the dog being held out of engaging or locking position.

Figure 4:
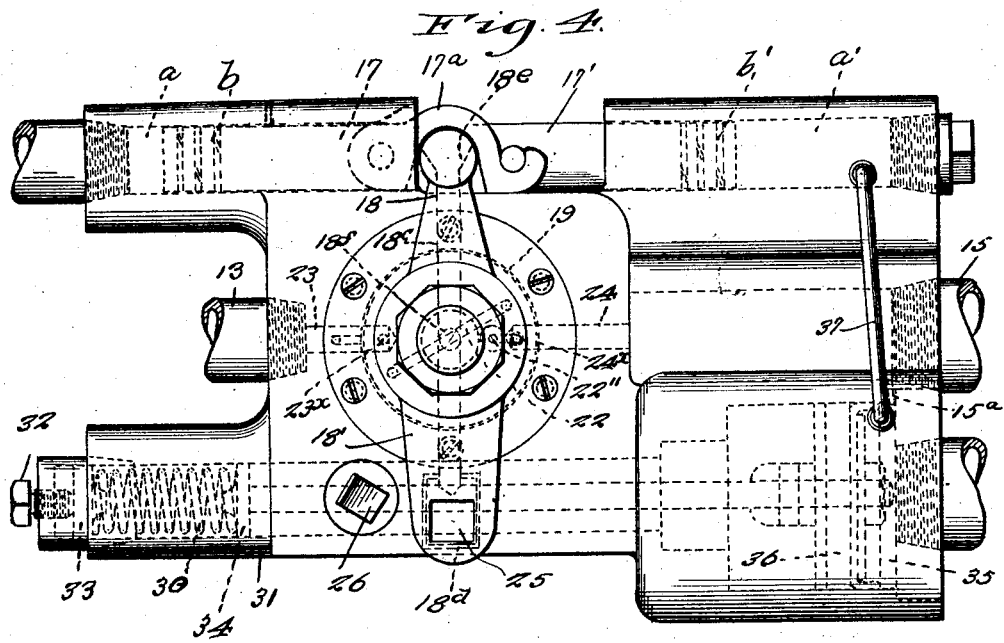
Figure 4 is a detail view of the trigger valve.
Figure 5:
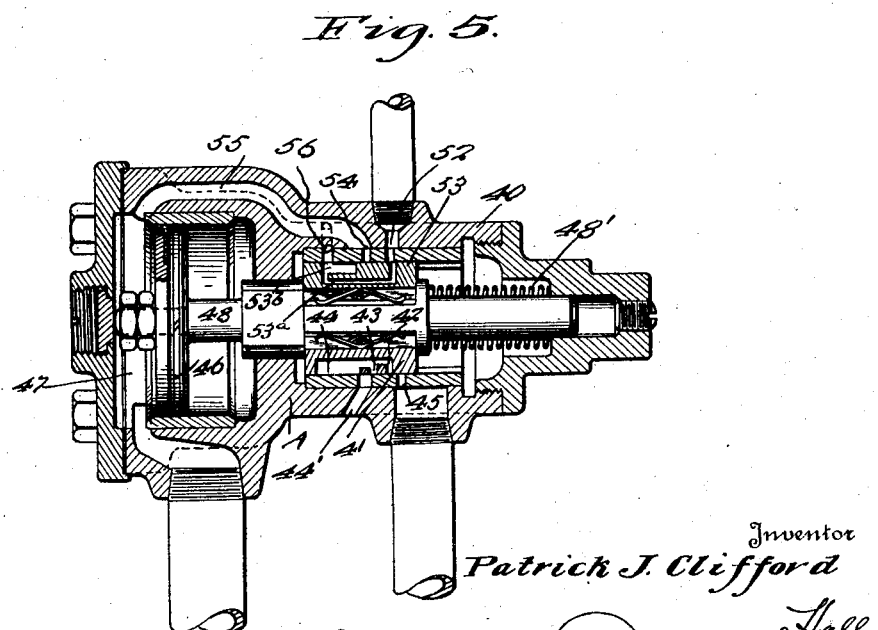
Figure 5 is a detail view of the automatic air release valve.

Referring to Figure 4 which shows a lever 18 18' belonging to the trigger valve if either arm of this lever breaks a release of chamber D air will take place and the brakes will be set. To accomplish this the trigger arm or lever is provided with a passage 18ᶜ which receives air through the port or passage 18ᶠ, from the by-pass passage 19ᶜ, these two passages being in communication through the space above the valve 19.

The trigger valve lever is provided with an opening 25 to engage the dog 26 and as shown in Figure 9 a small air passage 18ᵈ extends around this opening 25 in the wall of the lever or valve arm, this passage communicating with the air passage 18ᶜ so that if breakage occurs at the part of the lever adjacent the opening 25 chamber D air will be released. If breakage occurs at either one of the pistons 17, 17', the coupling 17ᵃ will be released and an air valve 18ᵉ will be freed from the holding effect of this coupling and the air from chamber D will then be free to escape by this valve.

Figure 3:
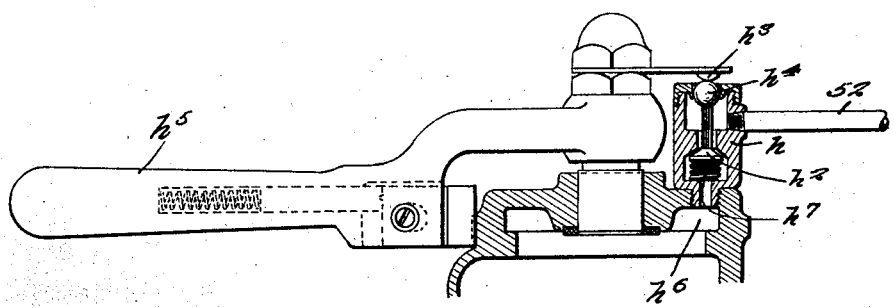
Figure 3 is a detail view of the supplemental valve combined with the engineer's valve, a portion of the latter being shown.

Another form is shown in Figure 12 in which the arm of the trigger valve is provided with an air port like that above described, but instead of using the coupling 17ª between the pistons 17 and 17', as in Fig. 3, these pistons in Figure 12 are shown hollow to receive the air pressure within them.

One of these hollow pistons is marked 17ˣ. If either one of these pistons breaks the air will be released and the brakes set. This improvement of Fig. 12 avoids the use of the coupling 17ª of Figure 3 and of the valve 18ᵉ of said Figure 3.

It is obvious that if the trigger arm 18, 18' of Fig. 3 is entirely removed this will allow the escape of air from chamber D.

Briefly stated I construct the lever of the trigger valve in such manner that if any portion of the same breaks release of chamber D air will take place because passages in this arm or lever are in communication with chamber D, and this is true also of the piston 17, 17' which operate the trigger arm.

Instead of placing the engineer's disabling valve as shown it may be placed in the train line pipe as in Case 284,731.

I claim:

1. In combination in an air brake apparatus, a main air reservoir, a train pipe, an automatic air release valve therefor, an engineer's disabling valve in the pipe leading from the main air reservoir to the engineer's automatic brake valve whereby the engineer will be prevented from recharging the train pipe but can make a further train pipe reduction when the automatic air release valve is operated, a valve for supplying air to the automatic air release valve and the engineer's disabling valve for operating them, an eliminating valve between said air supply valve and the automatic air release valve and engineer's disabling valve, an air pipe connection from the engineer's automatic brake valve to the eliminating valve for operating the same when the engineer sets his automatic brake valve in service position, and an air supply connection between the engineer's straight air valve and the disabling valve for restoring said valve to open position, substantially as described.

2. In combination in an air brake apparatus, a main air reservoir, a train pipe, an automatic air release valve therefor, an engineer's disabling valve in the pipe leading from the main air reservoir to the engineer's automatic brake valve whereby the engineer will be prevented from recharging the train pipe but can make a further train pipe reduction when the automatic air release valve is operated, a valve for supplying air to the automatic air release valve and the engineer's disabling valve for operating them, an eliminating valve between said air supply valve and the automatic air release valve and engineer's disabling valve, an air pipe connection from the engineer's automatic brake valve to the eliminating valve for operating the same when the engineer sets his automatic brake valve in service position, and an air supply connection between the engineer's straight air valve and the disabling valve for restoring said valve to open position, said air supply valve, when operated, remaining open to prolong the supply of air to the automatic air release valve and disabling valve, or when the eliminating valve is closed, prolonging the supply of air thereto until pressure builds up beyond said supply valve to a prescribed degree, and means for then restoring said supply valve to closed position, and whereby, if the engineer sets his automatic brake valve out of service position while the air supply valve is open, the consequent opening of the eliminating valve will supply air pressure to the automatic air release valve and to the disabling valve for their automatic operation, substantially as described.

3. In combination in an air brake apparatus, a main air reservoir, a train pipe, an automatic air release valve therefor, an engineer's disabling valve in the pipe leading from the main air reservoir to the engineer's automatic brake valve whereby the engineer will be prevented from recharging the train pipe but can make a further train pipe reduction when the automatic air release valve is operated, a valve for supplying air to the automatic air release valve and the engineer's disabling valve for operating them, an eliminating valve between said air supply valve and the automatic air release valve and engineer's disabling valve, an air pipe connection from the engineer's automatic brake valve to the eliminating valve for operating the same when the engineer sets his automatic brake valve in service position, and an air supply connection between the engineer's straight air valve and the disabling valve for restoring said valve to open position, said air supply valve, when operated, remaining open to prolong the supply of air to the automatic air release valve and disabling valve, or when the eliminating valve is closed, prolonging the supply of air thereto until pressure builds up beyond said supply valve to a prescribed degree, and means for then restoring said supply valve to closed position, and whereby, if the engineer sets his automatic brake valve out of service position while the air supply valve is open, the consequent opening of the eliminating valve will supply air pressure to the automatic air release valve and to the disabling valve for their automatic operation, a suitable lock being provided for holding the supply valve open until the prescribed pressure is built up, whereupon said lock will be released, substantially as described.

In testimony whereof, I affix my signature.

PATRICK J. CLIFFORD.